July 7, 1959
L. W. DEDEKIND
2,893,111
ROTARY CUTTER
Filed May 16, 1955
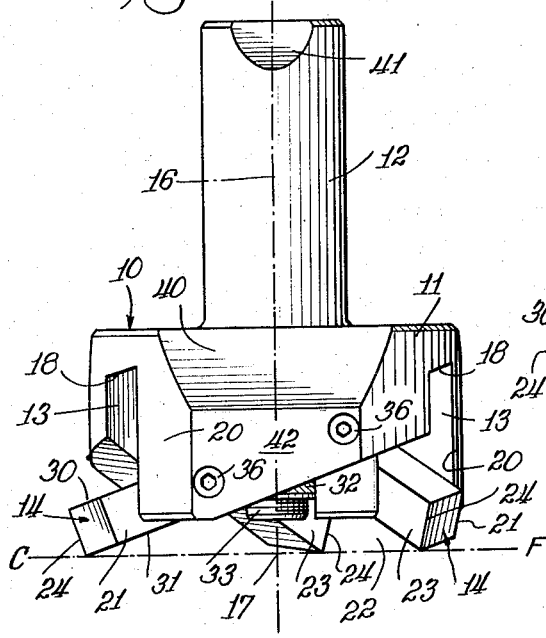
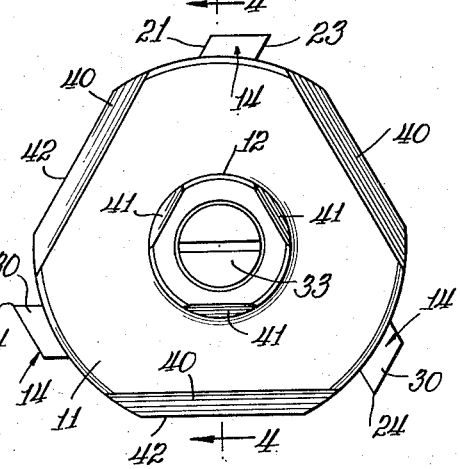
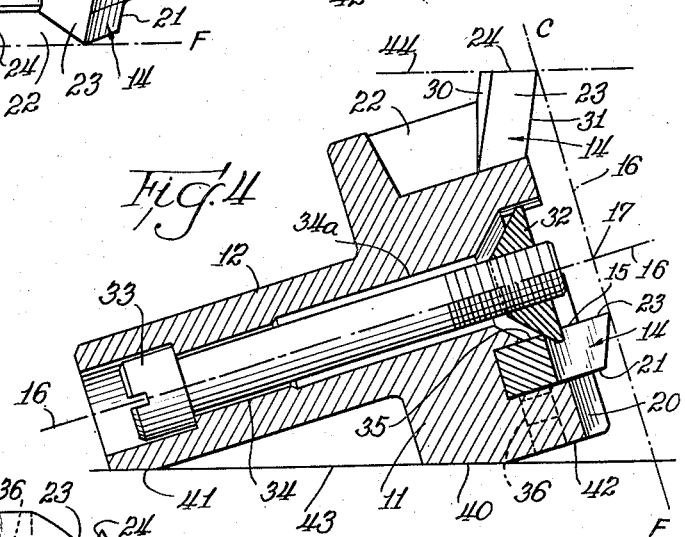
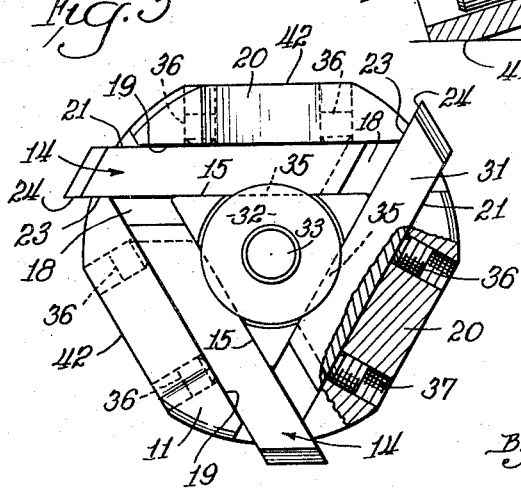
Inventor:
Lowell W. Dedekind
By: Mann, Brown and Hansmann
Attys.

United States Patent Office 2,893,111
Patented July 7, 1959

2,893,111

ROTARY CUTTER

Lowell W. Dedekind, Melrose Park, Ill.

Application May 16, 1955, Serial No. 508,344

6 Claims. (Cl. 29—105)

This invention relates to a rotary cutter having a plurality of cutting bits, and more particularly a cutter which can be sharpened in a simple, rapid operation that automatically produces symmetrically spaced cutting edges on the tool.

A rotary cutter for use in a milling machine, drill press, boring machine, or similar apparatus could in theory be provided with but a single cutting tooth or bit. However, in order to produce a symmetrical tool, with the many resulting advantages, it is of course necessary to have two or more cutting edges so that one edge can follow in the cutting path of the other.

The second condition for a symmetrical cutting tool is that the cutting edge of each of plurality of teeth or bits must be at substantially the same distance from the axis of rotation of the rotary cutter. This is essential in order to have each cutting edge follow in substantially the same track as the cutting edge of the preceding tooth or bit when the tool rotates. If one cutting edge extends outward a substantial distance farther from the axis of rotation than do the other cutting edges, that cutting edge will cut more deeply into the material being machined and will theretofore do more than its proportionate share of the cutting work. This will cause that particular tooth or bit to heat up and to have more stress imposed upon it than the others.

A related requirement is that each cutting edge shall be at the same angle to the axis of rotation of the tool. Substantial variation in this angle for any one of the cutting edges will produce a different shaped chip and different depth of cut for that particular tooth or bit.

The fourth requirement for a symmetrical cutting tool is that the lower ends of all the cutting edges shall fall in a single plane perpendicular to the axis of rotation of the tool. If any edge extends below this plane, that edge will cut more deeply into the surface being machined. The reverse will of course be true if the cutting edge terminates above the plane in question.

The final condition for a symmetrical cutting tool is that all the cutting edges must be disposed about the tool with equal angular spacing between them. If a particular cutting edge of the rotating tool follows more closely after its preceding tooth or bit than the other cutting edges of the tool do, that particular cutting edge will not cut so deeply into the surface being machined as the other teeth or bits do. In a milling operation, for example, the cutting tool rotates and moves forward at one and the same time, both at uniform predetermined rates. If the tool rotates a smaller angular distance between a particular pair of teeth or bits than between the other pairs, the second cutting edge of that particular pair will not have time to progress forward as far with respect to the tooth or bit preceding it, and so will not cut so deeply into the surface being machined.

*Disadvantages of prior art.*—The advantages of a symmetrical rotary cutting tool include among other things increased speed of cutting, balanced distribution of stress, and greater strength for the tool. However, with cutting tools of this type previously used, these advantages have been obtainable only at the expense of serious disadvantages in preparing the tool for use. It has been a very difficult, complicated, and time consuming job to grind the cutting edges of such tools in a manner which will produce the symmetry essential to proper use of the tool.

The method generally employed for sharpening rotary cutters having teeth permanently attached to the tool includes at least four separate setting up and grinding steps. First, the correct grinding wheel for the particular shape teeth to be sharpened must be mounted on the cutter grinder. Second, the cutter must be securely mounted between centers, in a collet, or by some other suitable means. Third, a supporting finger on the cutter grinder must be adjusted to effect the proper indexing of the various teeth during the grinding process. Fourth, each tooth must be ground successively on its outer surface.

These four steps are required for grinding the outer surface of each tooth. If it is necessary to grind the end of each tooth as well, additional steps are required. This may be made necessary by the particular shape of the teeth or by the degree of dullness exhibited by the cutting edges. These additional steps for each tooth include: Fifth, in some cases it may be necessary to change the grinding wheel in order to grind the ends of the teeth properly. Sixth, the cutter must be remounted in a new position between centers, in a collet, or by other suitable means. Seventh, the supporting finger is again adjusted. Eighth, each tooth is ground successively on its end.

With rotary cutters of larger sizes, a chamfer is sometimes desired on the cutting edges of the teeth. For this, the same series of four steps must be gone through again. This raises the number of steps in the sharpening process to a total of twelve.

Following this complicated method, it is practically impossible even for a skilled operator to sharpen a rotary cutter having three or more cutting teeth in less than ten or twenty minutes. The time required may be even longer, if the cutter grinder is used on a series of rotary cutters of various sizes and types, so that each time it is used it must be set up for another size or type of cutter.

In addition to this, the customary sharpening method requires a special cutter grinder of a type not owned by many tool rooms. Tool rooms not having this type of grinder must send their rotary cutters out for sharpening. This entails a loss of time in availability of the cutting tool during the period the tool is delivered for sharpening and is returned, as well as the time required for the actual sharpening. It also results in increased cost and extra bookkeeping.

Rotary cutters have been used which carry a plurality of bits removably attached to the tool body. However, for accuracy these have been sharpened with the bits secured on the body, using the same sharpening method just described, with all the same disadvantages.

*Invention summarized.*—The rotary cutter of the present invention includes two or more bits removably attached to the tool body in positions which are the same with respect to the axis of rotation of the body. The bits are equally spaced about the tool body, and each bit extends downward and outward from the tool body to the same extent so that as the tool rotates in use one cutting edge follows in the path of another. The tool includes means for positioning the tool body during sharpening of the bits to give them all cutting edges having substantially the same geometrical characteristics with respect to the rest of the tool.

The tool body of this rotary cutter has a plurality of flat surfaces about its side wall, each positioned generally opposite one of the cutting bits. Each of the surfaces lies in a plane which is at the same angle to the tool axis and at the same distance from the intersection of the axis and the plane of the cutting face of the tool. These surfaces adapt the tool for easy, rapid sharpening on a conventional reciprocating type of surface grinder having a rotating grinding wheel and a platform for receiving the tool to be sharpened which moves with reciprocal motion with respect to the grinding wheel.

*Advantages of this invention.*—Practically every tool room has a surface grinder of this reciprocating type, so one of the important advantages of this invention is that the rotary cutter can be sharpened in the same tool room where it is used, and does not have to be sent out for sharpening to a larger tool room having a special cutter grinder.

Another important advantage is that the entire sharpening process for a rotary cutter having three, or perhaps more, cutting edges takes no more than one or two minutes. This time is not increased materially even when a number of cutting tools of different sizes are ground successively, as there is only a single, rapid setting operation involved in readying the surface grinder for sharpening each new tool.

Because of the simplicity of the single adjustment required on the surface grinder and the simplicity of the sharpening process itself, the operator sharpening the rotary cutter of this invention needs no special skill to produce a sharpened tool having cutting edges that are arranged about the tool with perfect symmetry.

The invention will be described in relation to the embodiment shown in the drawings. In the drawings:

Figure 1 is a side elevation of a preferred embodiment of the rotary cutter of this invention;

Figure 2 is a plan view of the rotary cutter shown in Figure 1;

Figure 3 is a bottom view, partly broken away, of the same embodiment; and

Figure 4 is a sectional view taken substantially along line 4—4 of Figure 2.

*Tool body.*—Rotary cutter 10 has a body 11 the lower portion of which is generally cylindrical in shape, the upper portion being a shank 12 for rotatably mounting the tool in the milling machine or other apparatus in which it is to be used. Cutter 10 is shown in Figure 1 with its shank oriented vertically, in the position in which the tool will customarily be used. The terms "top wall," "inner wall," "outer wall," and similar terms as used in this specification and claims refer to this position of the tool, in which it is ready for a cutting operation upon a horizontal surface.

Grooves 13, rectangular in cross-section, are cut in the bottom of tool body 11. In the embodiment shown there are three groves, each lying along a chord of the generally circular bottom of the tool body and each separated from the other two grooves by the same angular spacing. Each of these grooves is adapted to receive a cutting bit 14.

The shape and position of each groove are of course determined by the dimensions and position of the three walls of the grooves which define its cross-section: the inner, upper and outer walls. In the embodiment shown, each groove has the same cross-sectional dimensions as all the other grooves. The position of the walls of the groove will now be described in more detail, as this plays an important part in this invention.

Each groove 13 has an inner wall 15 lying in a plane positioned at the same predetermined angle to axis of rotation 16 of tool body 11.

The "cutting face" of rotary cutter 10, designated by the letters CF in Figure 1, is defined for the purpose of this specification and claims as the plane perpendicular to axis of rotation 16 in which the lower ends of all the cutting edges of bits 14 fall. Axis of rotation 16 intersects plane CF at point 17.

Each of the grooves 13 has a top wall 18 lying in a plane which is at the same predetermined distance from point 17 as are the top walls of all the other grooves.

In the same way, the plane of inner wall 15 of each groove 13 is at the same predetermined distance from point 17 as are the planes of the inner walls of the other grooves.

As best seen in Figure 1, grooves 13 slant upward into tool body 11 from the end of the groove which is adapted to receive the cutting end of bit 14. Each top wall 18 lies in a plane which is at the same predetermined angle to axis of rotation 16 as is the plane of every other top wall.

Outer side walls 19 of grooves 13, as best seen in Figure 3, are located inwardly of the periphery of tool body 11 so that when cutting bits 14 are installed in place in the grooves a part of the mass of the tool body, designated as portion 20, is located behind heel 21 of bit 14 to back up the cutting edge of the bit. This provides additional strength and helps to eliminate bit chattering as the tool rotates.

As shown in Figure 1, portion 20 of tool body 11 is so formed that outer side wall 19 of each groove 13 is approximately as deep as the height of bit 14, and follows generally the upward slant of the groove. This results in portion 20 being large enough to back up the tool bit, and yet small enough that adequate chip clearance space 22 is provided on the leading side 23 of the next following cutting bit. If chip clearance space of adequate size were not provided, chips cut by bits 14 from the surface being machined would tend to pile up and jam together, thus producing excessive pressure on cutting edges 24 of the bits.

*Cutting bits.*—Tool bits 14 may be ordinary metal lathe tool bits, which can be purchased commercially in bulk. Using such bits, the rotary cutter of this invention may be employed for a variety of purposes. It may be used for general metal working purposes, or if desired may also be used at higher speeds as a wood planer.

The preferred material of which the bits are formed is in most cases high speed steel, but this depends upon the particular job on which the rotary cutter is to be used. With bits 14 retracted within tool body 11 as far as possible, bits formed of a material such as tungsten carbide may be employed for working upon hard metal surfaces.

In the preferred embodiment shown, the bit used has a square cross-section, with opposite walls being parallel plane surfaces. In addition, the bits are preferably all of the same height and width. However, as will be seen from the discussion given below in this specification, this invention is useful even if there is some variation in shape and size of the cutting bits.

For production of as symmetrical a cutting tool as possible, it is desirable to use cutting bits 14 having side walls 21 and 23, as well as a top wall 30 and a bottom wall 31, which lie in planes that are parallel and separated by as nearly equal distance for all the bits as is possible. With commercially available lathe bits purchased according to specified dimensions, the variation in these respective dimensions between side walls or between top and bottom walls will generally be no more than about .001" or .002" from one bit to another.

The user of the cutting tool may decrease this variance even further by using a micrometer to measure the bits to be used on a particular rotary cutter, selecting three bits for which these dimensions are equal within a few ten-thousandths of an inch. Another method of achieving still closer tolerances than are likely to be found in lathe tool bits chosen at random from a commercial bulk shipment is to precision grind the side walls and the top and bottom surfaces of the bits to within the tolerance desired before they are inserted in grooves 13.

In any event, it is preferred to select cutting bits with side wall 21 (defining the "heel" of the bit) and side wall 23 separated by a distance which will produce a "slip fit" between cutting bit 14 and the groove in which it is to be received.

*Attachment of cutting bits.*—In the embodiment shown, the three cutting bits 14 are attached to tool body 11 by pressure of a cone shaped element 32 which is threaded upon bolt 33 extending from the bottom of the tool. Bolt 33 is aligned with axis of rotation 16, and passes through channel 34 in the center of shank 12 and body 11, with its threaded end extending below the tool body between grooves 13. For convenience, the head of the bolt is countersunk into the end of the channel which opens upon the top end of shank 12.

A part of inner side wall 15 of each groove 13 is broken away to leave portion 35 of bit 14 exposed when the bit is inserted in the groove. Cone shaped nut 32 is screwed into threaded engagement with bolt 33 until the nut presses tightly against exposed portions 35 of bits 14, thus holding the bits securely in the grooves. If there is any slack in the fit between a bit and its groove, the bit will be pressed snugly against the upper wall 18 and outer wall 19 of the groove. To permit nut 32 to find the position in which it secures the bits most effectively, lower portion 34a of channel 34 is enlarged slightly to permit some play in the fit of the shank of bolt 33 within the channel.

This method of attachment may be employed with any number of cutting bits, but is most effective with three bits.

If desired, set screws 36 may be employed to help position bits 14 in grooves 13 before nut 32 has been securely tightened upon bolt 33. As best seen in Figure 3, set screws 36 are screwed into and through threaded holes 37 in portion 20 of tool body 11, which portion backs up heel 21 of the cutting bit. These set screws tend to press the bits snugly against inner walls 15 of the grooves, while nut 32 presses them tightly against upper walls 18.

*Positioning surfaces.*—Tool body 11 carries three flat positioning surfaces 40, each generally opposite cutting edge 24 of one of the cutting bits. In this specification and claims, the positioning surface opposing a given cutting edge is also considered the opposing positioning surface for the bit as a whole and for the groove in which it is secured.

The respective surfaces 40 lie in planes each of which is at the same predetermined angle to axis of rotation 16, and at the same predetermined distance from point of intersection 17 between axis 16 and the plane of cutting face CF. The angle between each surface 40 and axis of rotation 16 is less than ninety degrees. These surfaces are formed in tool body 11 by precision machining. Each surface is large enough that when the tool is laid upon the magnetic chuck of the work support table of a reciprocating type surface grinder of conventional construction, the tool will be held securely in position during operation of the grinder.

Supplementary surfaces 41 may also be formed at the top of shank 12, again with precision machining, lying in the same plane as the respective surfaces 40. As shown in Figure 4, rotary cutter 10 may then rest upon both flat surfaces 40 and 41 which are opposite the cutting bit to be sharpened.

Tool body 11 also carries another group of flat positioning surfaces 42. These surfaces are formed by precision machining and are positioned on tool body 11 in the same manner as are surfaces 40, except that they are parallel to axis of rotation 16. Positioning surfaces 42 are employed when it is desired to grind cutting edges 24 parallel to the axis of rotation of the tool body.

*Sharpening operation.*—The embodiment shown in the drawings is especially well adapted for rapid and easy sharpening on a reciprocating type surface grinder of conventional construction. The only requirement for the grinder is that as the grinding wheel rotates, the work support table on which the tool is held for sharpening shall move through a reciprocating or other cyclical path with respect to the axis of the grinding wheel.

As shown in Figure 4, rotary cutter 10 may be placed on flat support table 43 of the surface grinder by placing positioning surfaces 40 and 41 in contact with the magnetic chuck (not shown) which is an integral part of table 43.

The pair of positioning surfaces which are selected for use in the first sharpening operation are those opposite the bit which is observed to have become the dullest through previous use. If the bits have become so far worn down as to require it, nut 32 and set screws 36 should be loosened and bits 14 pushed forward in grooves 13 to positions where a sufficient part of the bit is available to provide a new cutting edge upon sharpening. The only setting which must be made on the grinding machine before the tool is sharpened is to make the vertical adjustment of the surface grinder which is necessary to bring plane 44 of the grinding surface of the rotating grinding wheel (not shown) to the predetermined distance from table 43 which will grind away the dull portion of the bit chosen for first grinding, and produce a satisfactory cutting edge 24.

The work support table is caused to move back and forth through its reciprocating cycle until cutting edge 24 has been satisfactorily formed on the first bit. Tool 10 is then rotated 120° to bring another set of surfaces 40 and 41 into contact with the magnetic chuck of support table 43, and the table is again caused to move back and forth. This step is then repeated for the third cutting bit of the tool.

The entire operation, including the initial adjustment to bring the grinding wheel into the desired vertical position with respect to support table 43, takes no more than a minute or two.

*Symmetry of tool.*—When the geometrical relationship between positioning surfaces 40, grooves 13, bits 14, and the rest of the tool are considered, it will be seen that the sharpening operation just described produces bit cutting edges all of which have substantially the same geometrical characteristics with respect to the rest of the rotary tool.

As already stated above, each positioning surface 40 lies in a plane which is at the same predetermined angle to axis of rotation 16 of tool body 11, and at the same predetermined distance from intersection point 17. Upper wall 18 and inner wall 15 of each grove 13 are positioned at the same predetermined angles to the opposing positioning surface 40 and to axis of rotation 16 at the respective angles of the corresponding walls of every other groove. As is best seen from Figure 4, this positions each of the three cutting bits 14 at the same angle to axis 16, and at the same angle to the groove's opposing positioning surface 40. Specifically, set screws 36 tend to press flat inner wall 23 of each bit against inner wall 15 of the groove in which it is secured, and cone shaped nut 32 presses flat top wall 30 of the bit against upper wall 18 of the groove.

In the surface grinder indicated in Figure 4, the plane of support table 43 and plane 44 of the grinding surface are parallel and separated by a predetermined distance. It follows—since each bit 14 is of the same size and shape and bears the same geometrical relationship to its opposing positioning surface 40—that cutting edges 24 of all three bits have the same geometrical relationship to their respective positioning surfaces 40.

Each positioning surface 40 bears the same geometrical relationship to the axis of rotation and cutting face of the tool. Thus each bit cutting edge 24 automatically falls in a plane having the same geometrical relationship with the axis of rotation and with the cutting face of the tool as do the planes in which the cutting edges of the other bits fall.

The final condition which locates the position of the cutting edges of the bits is the fact that inner wall 15 of each groove 13 is located at the same predetermined distance from point of intersection 17. This places each cutting edge 24 in a line which is not only at the same angle to axis of rotation 16, but at the same distance from intersection point 17.

In addition, since the bits are all equally spaced about the tool (as well as having the same geometrical relationship to tool body 11 in all other respects), each cutting edge 24 will be equally spaced from its preceding and following cutting edge.

Finally, the distance between upper face 30 and lower face 31 of each cutting bit 14 is the same. But cone shaped nut 32 presses each bit against upper wall 18 of its groove 13. Because of the orientation of the upper walls already described and the equal spacing of each of the upper walls from intersection point 17, the uniform distance between faces 30 and 31 brings the lower ends of cutting edges 24 of all three bits into a single plane—the plane of cutting face CF. Figures 1 and 4 show this most clearly.

The result is a rotary cutter which has cutting edges which are entirely symmetrical with respect to the rest of the cutting tool. The accuracy of the symmetry depends only upon the accuracy of the various measurements described; it does not depend upon the skill of the operator who is sharpening the tool. Nor does the sharpening operation require a complicated grinding machine. Yet, with all these advantages, the rotary cutter of this invention may be sharpened in a matter of no more than a minute or two.

The above detailed description of this invention is given for clearness of understanding only. No unnecessary limitations should be understood therefrom, as modifications will be obvious to those skilled in the art.

I claim:

1. A rotary cutter having a plurality of cutting bits which comprises: a rotatably mountable tool body, said tool body having a plurality of flat surfaces on its periphery, said surfaces lying in respective planes each of which is at the same predetermined angle to the axis of rotation of the body, at the same predetermined distance from the point where said axis intersects the plane of the cutting face of the tool, and at the same predetermined angle to the planes of the adjoining flat surfaces on either side, said tool body also having a plurality of bit-receiving grooves in its bottom face, one of said grooves terminating generally opposite each of said flat surfaces, each groove having the same cross sectional dimensions, each groove having an upper wall, an inner wall, and an outer wall, each of said upper and inner walls lying in a plane which is at the same predetermined distance from said point of intersection and is positioned at the same predetermined angle to the opposing flat surface and to said axis of rotation, the outer side wall of the groove being located inwardly of the periphery of the tool body and being approximately as deep as the height of the bit which is inserted in the groove so that when a bit is installed in place in the groove a part of the mass of the tool body is located behind the heel of the tool bit to back up the cutting edge of the bit and so that chip clearance space is also provided on the leading side of the next following cutting bit; a cutting bit for each groove, said bit having dimensions permitting it to be seated in the groove with a slip fit, each bit having the same cross sectional dimensions as all the other bits; and means securing each bit in its respective groove.

2. A rotary cutter having a plurality of cutting bits which comprises: a rotatably mountable tool body, said tool body having a plurality of flat surfaces on its periphery, said surfaces lying in respective planes each of which is at the same predetermined angle to the axis of rotation of the body and at the same predetermined distance from the point where said axis intersects the plane of the cutting face of the tool, said tool body also having a plurality of bit-receiving grooves in its bottom face, one of said grooves terminating opposite each of said flat surfaces, each groove being positioned at the same predetermined angle to the opposing flat surface and to said axis of rotation and having an upper wall lying in a plane which is at the same predetermined distance from said point of intersection; and a cutting bit securely seated in each groove.

3. A rotary cutter having a plurality of cutting bits which comprises: a rotatably mountable tool body, said tool body having a plurality of flat surfaces on its periphery, said surfaces lying in respective planes each of which is at the same predetermined angle to the axis of rotation of the body and at the same predetermined distance from the point where said axis intersects the plane of the cutting face of the tool, said tool body also having a plurality of bit-receiving grooves in its bottom face, one of said grooves terminating opposite each of said flat surfaces, each groove having an inner side wall lying in a plane which is at the same predetermined angle to the opposing flat surface and said axis of rotation, and at the same predetermined distance from said point of intersection, as the plane of the inner side walls of every other groove; and a cutting bit for each groove, said bit having a flat inner side wall and being securely seated in its respective groove with its inner side wall pressed tightly against the inner side wall of the groove.

4. A rotary cutter having a plurality of cutting bits which comprises: a rotatably mountable tool body, said tool body having a plurality of flat surfaces on its periphery, said surfaces lying in respective planes each of which is at the same predetermined angle to the axis of rotation of the body and at the same predetermined distance from the point where said axis intersects the plane of the cutting face of the tool, said tool body also having a plurality of bit-receiving grooves in its bottom face, one of said grooves terminating opposite each of said flat surfaces, each groove having an outer side wall lying in a plane which is at the same predetermined angle to the opposing flat surface and said axis of rotation, and at the same predetermined distance from said point of intersection, as the plane of the outer side walls of every other groove; and a cutting bit for each groove, all of said bits having the same width and having flat inner and outer side walls parallel to each other, each bit being securely seated in its respective groove with its outer side wall pressed tightly against the outer side wall of the groove.

5. A rotary cutter having a plurality of cutting bits which comprises: a rotatably mountable tool body, said tool body having a plurality of flat surfaces on its periphery, said surfaces lying in respective planes each of which is at the same predetermined angle to the axis of rotation of the tool body and at the same predetermined distance from the point where said axis intersects the plane of the cutting face of the tool, said tool body also having a plurality of bit-receiving grooves in its bottom face, one of said grooves terminating opposite each of said flat surfaces, each groove having an upper wall lying in a plane which is at the same predetermined angle to the opposing flat surface and said axis of rotation, and at the same predetermined distance from said point of intersection, as the plane of the upper walls of every other groove; and a cutting bit for each groove, each bit having the same height and having flat top and bottom walls parallel to each other, each bit being securely seated in its respective groove with its top wall pressed tightly against the upper wall of the groove.

6. A bit holder for a rotary cutter having a plurality of cutting bits which comprises: a rotatably mountable tool body, said tool body having a plurality of flat surfaces on its periphery, said surfaces lying in respective planes each of which is at the same predetermined angle to the axis of rotation of the body and at the same predetermined distance from the point where said axis intersects the plane of the cutting face of the tool, said tool body also having a plurality of bit-receiving grooves in its bottom face, one of said grooves terminating opposite each of said flat surfaces, each groove being positioned at the same predetermined angle to the opposing flat surface and to said axis of rotation and having an upper wall lying in a plane which is at the same predetermined distance from said point of intersection.

References Cited in the file of this patent

UNITED STATES PATENTS

| | | |
|---|---|---|
| 1,908,155 | Jorgensen | May 9, 1933 |
| 2,097,898 | Severson | Nov. 2, 1937 |
| 2,375,358 | Hart | May 8, 1945 |
| 2,492,797 | Guetzkow | Dec. 27, 1949 |
| 2,539,289 | Varvin | Jan. 23, 1951 |
| 2,557,404 | Armitage et al. | June 19, 1951 |

FOREIGN PATENTS

| | | |
|---|---|---|
| 115,648 | Germany | Nov. 28, 1900 |
| 845,436 | Germany | July 31, 1952 |

UNITED STATES PATENT OFFICE

CERTIFICATE OF CORRECTION

Patent No. 2,893,111                                        July 7, 1959

Lowell W. Dedekind

It is hereby certified that error appears in the printed specification of the above numbered patent requiring correction and that the said Letters Patent should read as corrected below.

Column 1, line 37, for "theretofore" read -- therefore --; column 6, line 49, for "at" read -- as --.

Signed and sealed this 13th day of September 1960.

(SEAL)

Attest:

KARL H. AXLINE
Attesting Officer

ROBERT C. WATSON
Commissioner of Patents